J. HOUGH.
Grist Alarm.

No. 43,409.  Patented July 5, 1864.

Witnesses.

Inventor.
Joseph Hough
per Munn & Co.
Attys.

UNITED STATES PATENT OFFICE.

JOSEPH HOUGH, OF WEST CHESTER, PENNSYLVANIA.

IMPROVEMENT IN MOTIVE-POWER CUT-OFFS IN GRIST-MILLS.

Specification forming part of Letters Patent No. 43,409, dated July 5, 1864.

*To all whom it may concern:*

Be it known that I, JOSEPH HOUGH, of West Chester, in the county of Chester and State of Pennsylvania, have invented a new and improved means for automatically cutting off the motive power from grist or flouring mills when the hoppers of the same become empty; and I do hereby declare that the following is a full, clear, and exact description of the same, reference being had to the accompanying drawings, making a part of this specification, in which—

Figure 1:
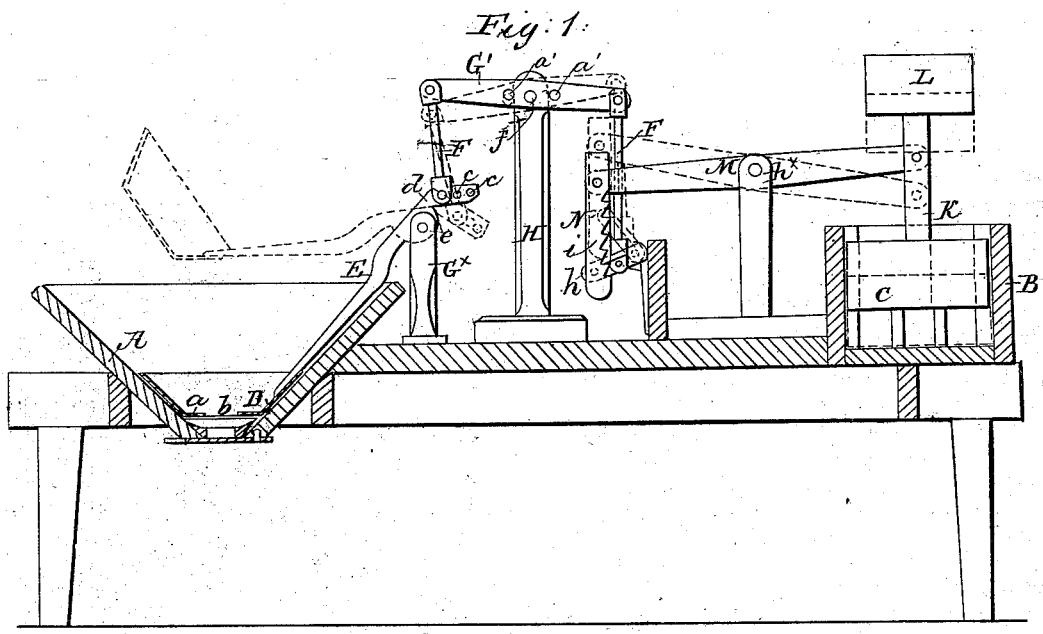
Figure 2:
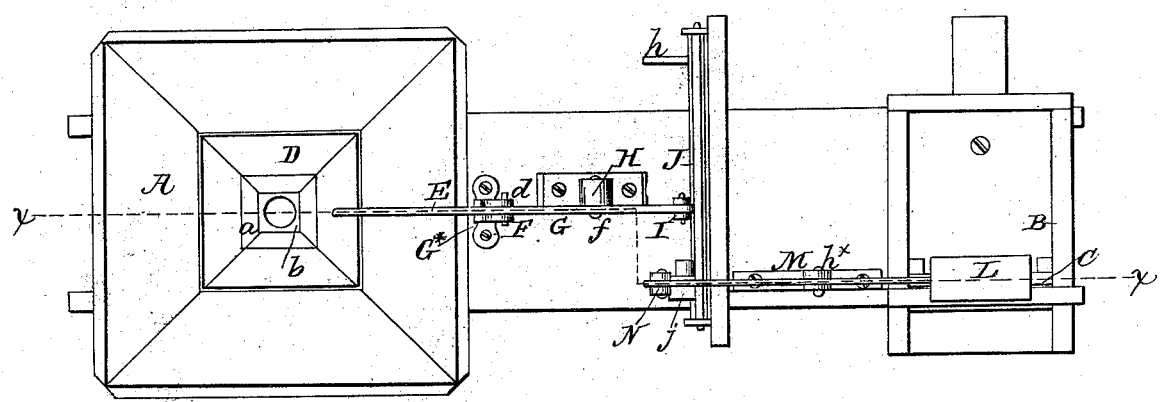

Figure 1 is a side sectional view of my invention; Fig. 2, a plan or top view of the same.

Similar letters of reference indicate corresponding parts in the two figures.

This invention consists in the employment or use of a supplemental hopper placed within the ordinary hopper of a pair of millstones, and connected by means of levers and a rock-shaft to the gate of a water-wheel, or to the idle or friction pulley of a driving-belt, in such a manner that when the hopper becomes empty the gate of the water-wheel will automatically close or the driving-belt be slackened so as to stop the mill.

To enable those skilled in the art to fully understand and construct my invention, I will proceed to describe it.

A represents the hopper of a pair of millstones, constructed in the usual way, and B represents the penstock of a water-wheel, and C the gate thereof. These parts may all be constructed and arranged in the usual or any proper way.

D is the supplemental hopper, which is placed within the hopper A and is attached to the lower end of a lever, E. This hopper D is fitted in the lower part of the hopper A, and it may be constructed of sheet metal, with a horizontal flange, $a$, around its discharge-orifice $b$. The lever E is provided near its upper end with a series of holes, $c$, through any of which the lower end of a rod, F, is connected to E by a pin, $d$, and the fulcrum-pin $e$ of the lever E passes through an upright, $G^\times$, near the hopper. The rod F is connected at its upper end to one end of a lever, G, the fulcrum-pin $f$ of which passes through the upper end of an upright, H, and the opposite end of the lever G has a rod, I, attached to it, the lower end of the latter being connected by a pin, $g$, with an arm, $h$, which projects from a rock-shaft, J, the arm $h$ having a series of holes made in it, through any of which the pin $g$ may pass. The gate C in the penstock B has an upright, K, attached to it, with a weight, L, at its upper end, and to the upright K one end of a lever, M, is connected, said lever having its fulcrum at $h^\times$.

N is a pendant which is attached to the opposite end of the lever M, and has a series of notches, $i$, at its lower part. These notches engage with a lip, $j$, which projects from the rock-shaft J.

The operation is as follows: The weight L on the upper end of the upright K is designed to be sufficiently heavy to keep the supplemental hopper D in an elevated position, as shown in red in Fig. 1; but when grain is placed in the hopper A the additional weight will keep the hopper D depressed and the gate C raised, so as to admit the water on the wheel, as shown in black in Fig. 1. It will be seen, therefore, that when the grain all passes out from the supplemental hopper D the weight L, in connection with that of the gate, will overcome the weight of the supplemental hopper D alone, and the gate will descend or close, the hopper D being raised to the position as shown in red in Fig. 1.

The leverage-connection between the gate C and the supplemental hopper D may be varied or modified by changing the position of the pins $d$ $g$ in the different holes designed for them, and also by varying the position of the fulcrum-pin $f$ of the lever G, the latter being provided with several holes, $a'$, to admit of this result. The rock-shaft J may also be provided with several arms, $h$, so that the device may be applied to several pairs of stones.

I would remark that the parts herein described may be arranged in various ways to suit the position of the millstones, penstock, &c., and that the same invention may be applied to the belt of a driving-drum by having the lever M connected to an idle or friction pulley, so as to raise said pulley and slacken the belt when the hopper becomes empty. The invention, therefore, is applicable not only when water is used as a motor, but also when steam is used.

Having thus described my invention, what I claim as new, and desire to secure by Letters Patent, is—

The arrangement of the supplemental hopper D, levers E G M, rods F I N, and rock-shaft J, in combination with the gate of a water-wheel, or with the idle or friction roller of a driving-belt, for the purpose of automatically disconnecting the motive power of a grist-mill, substantially as specified.

JOSEPH HOUGH.

Witnesses:
    EBER MILES,
    WM. BALDWIN.